Sept. 11, 1962  E. JONES  3,053,499
VALVE
Filed June 15, 1959

INVENTOR.
Evan Jones,
BY Cromwell, Greist-Warden
ATTYS

3,053,499
VALVE

Evan Jones, Evanston, Ill., assignor to Henry Valve Company, Melrose Park, Ill., a corporation of Illinois
Filed June 15, 1959, Ser. No. 820,189
9 Claims. (Cl. 251—284)

The present invention is directed to a new and improved valve assembly of the flexible diaphragm type, the invention also being specifically directed to a diaphragm limiting and spring retainer element for use in a valve assembly.

Diaphragm valves are used in many applications, particularly in the refrigeration field. Diaphragms formed from chemically inert materials such as "Teflon" function is such valves as a valve element which is movable by a flexure into and out of engagement with a valve seat. As is common in such assemblies, the valve seat is usually formed from relatively hard material which, upon pressure closing of the diaphragm in compressed engagement therewith, bites into the diaphragm material and may eventually leave a valve seat outline depression therein which materially weakens the diaphragm to eventually cause rupture or, at least, adversely affects the operating efficiency of the diaphragm. "Teflon" is a relatively hard material but when used as a diaphragm and continuously compressed against a valve seat, becomes weakened as a result of a fairly deep impression of the valve seat being formed therein. Accordingly, the valve user is cautioned against over-tightening of the valve during use thereof as this contributes significantly to the forming of a deep valve seat impression in the diaphragm.

It is an object of the present invention to provide a new and improved valve assembly of the diaphragm type which includes therein a diaphragm tightening limiting means of new and improved design, the limiting means functioning with the diaphragm to prevent "over-closing" of the valve to materially increase the effective life of the diaphragm.

A further object taken in conjunction with the foregoing object is to provide a new and improved valve assembly in which the diaphragm tightening limiting means not only functions as described but further defines a spring seat by means of which a spring acts against the closing movement of the diaphragm to provide for a return of the same to its original position out of engagement with the valve seat upon opening of the valve assembly Still a further object is to provide a new and improved combination diaphragm tightening limiting and spring retainer means for use in a diaphragm valve assembly, the means being of novel design to impart to the diaphragm a bottoming effect which is useful in controlling the extent to which a diaphragm is compressed against a valve seat.

Other objects not specifically set forth will become apparent from the following detailed description of the present invention made in conjunction with the accompanying drawings wherein.

Figure 1:
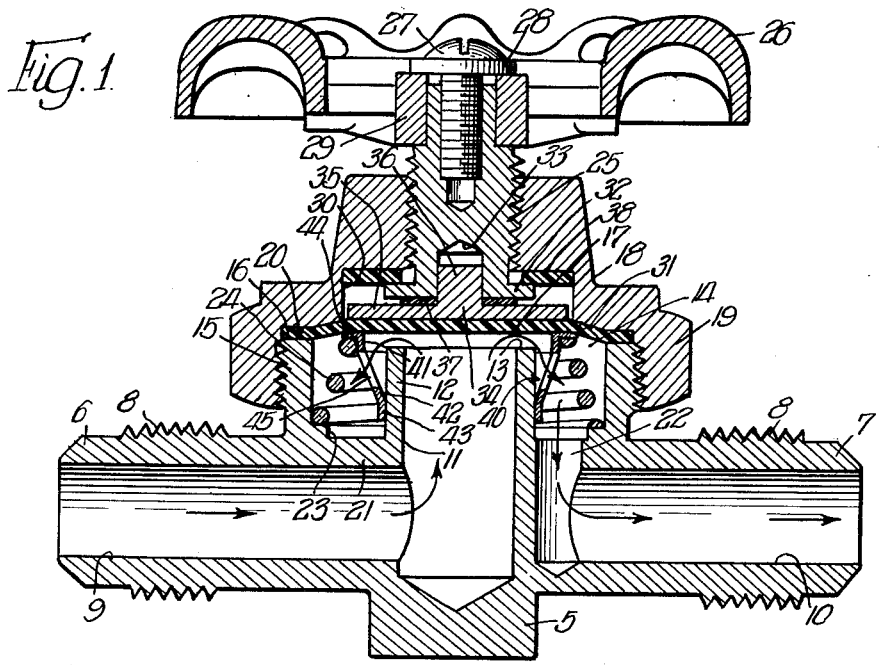
FIG. 1 is a vertical section of a known type of diaphragm valve illustrating the same in the open position, the valve incorporating in its assembly the new and improved diaphragm tightening limiting and spring retainer means of the present invention.
Figure 2:
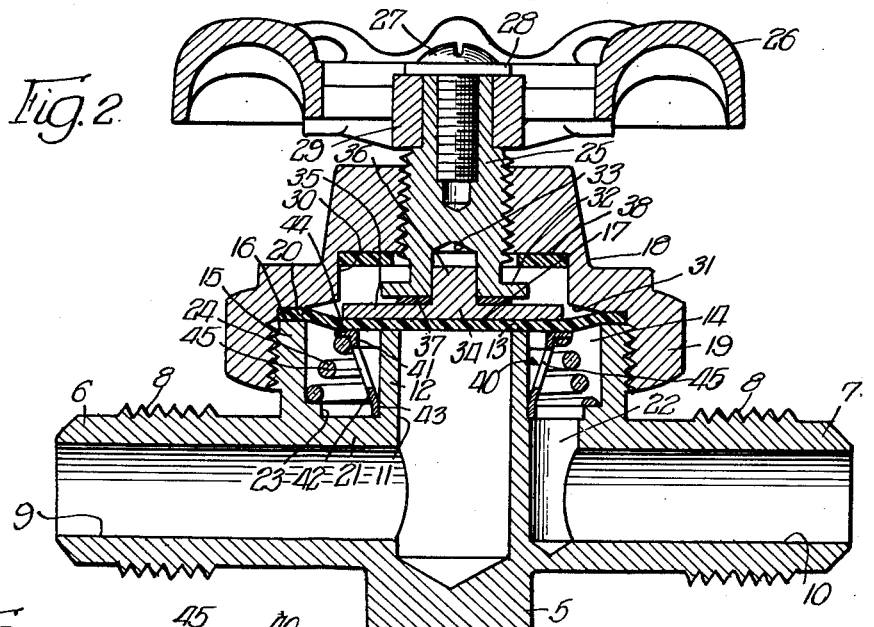
FIG. 2 is a view similar to FIG. 1 illustrating the diaphragm valve in closed position and in this position illustrating the functioning of the diaphragm tightening limiting means.

The valve assembly of FIGS. 1 and 2 is of known type similar to that disclosed in my co-pending application Serial Number 579,098, filed April 18, 1956, which has matured into Patent No. 2,895,497. The assembly includes a valve body 5 provided with oppositely directed integral nipples 6 and 7 having external threads 8 and which define fluid passageways 9 and 10 respectively. The passageway 9 communicates with a vertically extending passageway 11 near the bottom thereof, this passageway being defined by an annular valve seat wall 12, the top radial edge of which defines a valve seat 13. The annular wall 12 extends upwardly toward the top of the valve body 5 a substantial distance into a valve chamber 14 defined by an annular outer valve body wall 15 symmetrically located about the inner valve seat wall 11 and integrally formed with the nipples 6 and 7.

The top radial edge of the outer wall 15 defines a diaphragm seat 16 for a diaphragm 17 of large diameter formed from flexible material such as "Teflon." The diaphragm 17 is peripherally clamped against the radial edge 16 by a valve bonnet or cap 18 provided with an axially extending annular bottom or end wall 19, the innermost end of which is defined by an inwardly directed radial shoulder 20 which engages the top surface of the peripheral edge of the diaphragm 17 to seal the same with respect to the radial edge 16. The inner surface of the annular wall 19 is threadedly received about the outer annular wall 15 to removably retain the valve cap 18 on the valve body 5.

The bottom surface of the valve chamber 14 is defined by a radially directed wall 21 which is provided with at least one vertically drilled opening 22 communicating the valve chamber 14 with the passageway 10. The outer peripheral edge of the bottom wall 21 is provided with an upstanding annular shoulder 23 which is generally circumferentially continuous and the top radial surface thereof forms a bottom seat for a coil spring 24. The spring 24 is cone-shaped having its base mounted on the shoulder 23 and completely carried to one side of the opening 22 out of flow-restricting relation therewith. The top portion of the cone-shaped spring 24 is truncated for operative engagement with the diaphragm 17 well outwardly of the area of engagement between the diaphragm 17 and the valve seat 13. The diameter of the base of the spring 24 is slightly less than the inner diameter of the valve chamber 14 to center the spring therein in supported engagement with the shoulder 23.

The valve cap 18 carries a threadedly received, vertically directed valve stem 25 which is connected at its upper end to a handwheel 26 by a screw 27 inserted through a washer 28. The handwheel 26 is provided with a flat-sided socket 29 which receives the top end of the stem 25 therein and prevents relative movement between the handwheel and stem. The bottom portion of the stem 25 is received within an axially and downwardly opening annular recess 30, the lowermost end of which is defined by the radially outwardly and downwardly inclined annular shoulder 31 which joins the diaphragm retaining surface 20 interiorly of the outer wall 19. The bottom surface of the stem 25 is provided with a radially directed annular flange or shoulder 32 and is centrally apertured in an inwardly direction to define a bearing plate mounting bore 33. A bearing plate 34 formed from a radially extending disk portion 35 and an integral upstanding centrally located stud 36 is movably mounted between the end of the stem 25 and the diaphragm 17. The stud 36 is received within the bore 33 and is relatively movable therein being loosely received to an extent that the bore 33 does not frictionally retain the bearing plate 34 in fixed association with the stem 25. Intermediate the opposed surfaces of the stem 25 and bearing plate 34 is positioned a washer 37 received about the stud 36. As the bearing plate 34 is not frictionally held in the bore 33 of the stem 25, this element in effect rests on the top surface of the diaphragm 17 and is constantly in engagement with the same during operation of the valve.

Upon advancing of the valve stem 25 toward the valve seat 13 by turning the handwheel 26, the radial annular shoulder 33 rotates relative to the bearing plate 34 and moves the same and the diaphragm 17 toward and into engagement with the valve seat 13 as shown in FIG. 2. The valve assembly is then in its closed position and the spring 24 is compressed by the downward movement of the valve stem 25. In opening the valve assembly to the position shown in FIG. 1, the valve stem 25 is retracted and rotates relative to the bearing plate 34. Upon retraction of the valve stem 25, the spring 24 moves the diaphragm 17 upwardly out of engagement with the valve seat 13 and fluid flow through the valve is established as indicated by the arrows.

Due to the biasing action of the spring 24, the diaphragm 17 is maintained in engagement with the bearing plate 34 at all times and the bearing plate 34 is constantly urged upwardly against the bottom of the valve stem 25 thereby maintaining it in its operative position with respect to the valve stem 25 and diaphragm 17. The diaphragm is moved upwardly away from the valve seat 13 until the top surface of the annular shoulder 32 abuts a relatively soft back-seat washer 38 retained in engagement with the rear radial face of the recess 30 and surrounding the valve stem 25. Contact between these elements restricts further upward movement or retraction of the stem 25 and at this point the peripheral portion of the diaphragm 17 immediately outwardly of the peripheral edge of the bearing plate 34 contacts the inclined radial shoulder 31 of the valve cap 18. The inclined radial shoulder 31 is provided to prevent damage to the diaphragm 17 by contact with sharp edges or corners in its fully retracted position.

Figure 3:
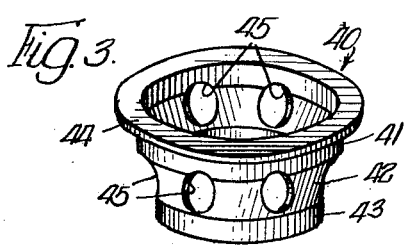
FIG. 3 is a perspective of the diaphragm tightening limiting and spring retainer means of the present invention.

The improvement in the valve assembly described resides in the utilization therein of a diaphragm tightening limiting and spring retainer means generally designated by the numeral 40. As particularly shown in FIG. 3, limiting and retainer means is in the form of an inverted frusto-conical sleeve having an upper axially extending portion 41 of greatest diameter, an intermediate angled portion 42 and a bottom end base portion 43 which is also axially directed but is of substantially smaller diameter than the upper end portion 41. A circumferentially continuous, radially outwardly directed flange 44 is integrally formed with the upper edge portion of the axial portion 41. The flange 44 constitutes a spring seat which, as shown in FIGS. 1 and 2, is located between the upper end of the spring 24 and the diaphragm 17. The bottom end portion 43 is dimensioned to be somewhat closely received about the valve seat wall 11 to be centered thereby. In this respect, it will be noted that the limiting and retainer means 40 is received within the spring 24 and is also centered thereby.

The intermediate portion 42 is preferably provided with a plurality of perforations or holes 45 which are circumferentially spaced throughout. These perforations provide for fluid flow through the limiting and retainer means 40 within the valve chamber 14. With the provision of a perforated intermediate portion 42, the sleeve 40 may be provided with a limited degree of resiliency permitting limited axial compression thereof if desired. This feature will be described below in conjunction with the operational aspects and advantages of the limiting and retaining means 40.

In the open condition of the valve assembly as shown in FIG. 1, it will be noted that the limiting and retainer means 40 is moved upwardly along the outer surface of the inner valve seat wall 11 by the expanding action of the spring 24. Upon closing of the valve assembly by turning of the handwheel 26 as previously described, downward movement of the diaphragm 17 against the action of the spring 24 results in a compression of the spring 24 and downward movement of the sleeve 40 toward the bottom wall 21 of the valve chamber 14. The straight line axial dimension of the sleeve 40 is preferably such that the bottom end portion 43 thereof contacts the bottom wall 21 of the valve chamber 14 at approximately the same time that the diaphragm 17 engages the valve seat 13. This action should be such that suitable engagement is obtained between the diaphragm 17 and the valve seat 13 to effectively close the valve assembly. However, if the sleeve 40 is slightly resilient as previously described, the operator of the valve will be provided with a definite indication of the exact moment at which the diaphragm 17 contacts the valve seat 13 by the creation of an immediate resistance to further turning of the handwheel as caused by the bottoming of he sleeve 40 against the bottom wall 21 of the valve chamber 14. With this definite indication, the operator need only turn the handwheel 26 a small fraction of a revolution to assure proper sealing engagement between the diaphragm 17 and the valve seat 13. Such further turning will be limited by the degree of resiliency supplied to the sleeve 40. Such resiliency should be maintained at a minimum as, obviously, the purpose of the sleeve 40 is to prevent deep pressing of the valve seat 13 into the diaphragm 17.

With the use of the diaphragm limiting and spring retainer means 40 described, a diaphragm valve may be operated without excessive deformation of the diaphragm at the seat contact area. With the diaphragm tightening limiting means also constituting a spring retainer means, any deformation of the diaphragm will occur in the area of contact of the retainer flange 44, this area being spaced substantially outwardly from the valve seat area. Accordingly, it is an important feature of the invention that the sleeve 40 be shaped as an inverted frusto-cone. With this arrangement the unit loading of the diaphragm at the seat contact area is substantially reduced and the life of the diaphragm is materially increased. The sleeve 40 provides a definite mechanical stop which is readily noticeable to the operator and which is mechanically effective in preventing excessive deformation of the diaphragm in the seat contact area. Thus, an attempted application of excessive closing torque to the handwheel 26 will not result in diaphragm damage.

Obviously certain modifications and variations of the invention as hereinbefore set forth may be made without departing from the spirit and scope thereof, and therefore only such limitations should be imposed as are indicated in the appended claims.

I claim:

1. A valve assembly including a fluid flow chamber having projecting centrally thereinto an annular fluid inlet means the end surface of which defines a valve seat, fluid outlet means in communication with said chamber, a flexible diaphragm enclosing said chamber above said seat, means for moving said diaphragm into engagement with said seat to close said inlet means, resilient means in said chamber and acting against said diaphragm to move the same out of engagement with said seat, and diaphragm limiting means in said chamber positioned about said seat, said limiting means being limitedly axially compressible and mounted in engagement with the valve seat engaging face of said diaphragm for movement therewith and being dimensioned for bottoming in said chamber upon a predetermined degree of contact between said diaphragm and said seat.

2. The valve assembly of claim 1 wherein said resilient means is in the form of a coil spring with said diaphragm limiting means received within said spring.

3. The valve assembly of claim 1 wherein said resilient means is in the form of a coil spring with said diaphragm limiting means received within said spring, the upper periphery of said limiting means being provided with a radially directed spring retainer flange which engages said diaphragm and on which one end of said spring is seated.

4. The valve assembly of claim 1 wherein said resilient means is in the form of a coil spring with said diaphragm limiting means received within said spring, the upper periphery of said limiting means being provided with a radially directed spring retainer flange which engages said diaphragm and on which one end of said spring is seated, the lower portion of said limiting means converging into close association with the outer surface of said inlet means.

5. The valve assembly of claim 1 wherein said diaphragm limiting means is generally in the form of an inverted frustoconical sleeve having an upper end portion of greater diameter in engagement with said diaphragm, an intermediate portion which is circumferentially perforated for fluid flow therethrough, and a bottom end portion of smaller diameter which closely surrounds said inlet means.

6. The valve assembly of claim 1 wherein said diaphragm limiting means is generally in the form of an inverted frustoconical sleeve having an upper end portion of greater diameter in engagement with said diaphragm, an intermediate portion which is circumferentially perforated for fluid flow therethrough, and a bottom end portion of smaller diameter which closely surrounds said inlet means, the weakening of said intermediate portion by reason of perforation thereof imparting a degree of resiliency to said sleeve.

7. A valve assembly including a fluid flow chamber defined between an outer valve body wall and an inner valve seat wall which projects upwardly into said chamber and the top surface of which constitutes a valve seat, inlet means in communication with said valve seat, outlet means in communication with said chamber, a valve closure assembly received on said valve body wall in chamber enclosing relation, a flexible diaphragm extending across said chamber above said seat and being mounted for flexing movement downwardly into engagement with said seat to close off said inlet means, diaphragm engaging and moving means forming a part of said valve closure assembly to move said diaphragm into engagement with said seat, resilient means in said chamber and acting against said diaphragm to move the same out of engagement with said seat, and diaphragm limiting means in said chamber received about said seat, said limiting means being limitedly compressible and mounted in engagement with the valve seat engaging face of said diaphragm for movement therewith and being dimensioned for bottoming in said chamber upon a predetermined degree of contact between said diaphragm and said seat.

8. The valve assembly of claim 7 wherein said resilient means is in the form of a coil spring with said diaphragm limiting means received within said spring, the upper periphery of said limiting means being provided with a radially directed spring retainer flange which engages said diaphragm and on which one end of said spring is seated, the lower portion of said limiting means converging into close association with the outer surface of said inner valve seat wall.

9. The valve assembly of claim 7 wherein said diaphragm limiting means is generally in the form of an inverted frustoconical sleeve having an upper end portion of greater diameter in engagement with said diaphragm, an intermediate portion which is circumferentially perforated for fluid flow therethrough, and a bottom end portion of smaller diameter which closely surrounds said inner valve seat wall, the weakening of said intermediate portion by reason of perforation thereof imparting a degree of resiliency to said sleeve.

References Cited in the file of this patent
UNITED STATES PATENTS

| | | |
|---|---|---|
| 2,464,400 | Hooper | Mar. 15, 1949 |
| 2,851,243 | Tannock | Sept. 9, 1958 |
| 2,870,986 | Vargo | Jan. 27, 1959 |

FOREIGN PATENTS

| | | |
|---|---|---|
| 1,100,179 | France | of 1955 |
| 518,431 | Great Britain | Feb. 27, 1940 |
| 596,533 | Great Britain | Jan. 6, 1948 |